United States Patent
Ciou et al.

(10) Patent No.: US 11,567,843 B2
(45) Date of Patent: Jan. 31, 2023

(54) METHOD AND SYSTEM FOR INDICATING BIOS POST STATUS FROM A CHASSIS IDENTIFYING LED

(71) Applicant: Quanta Computer Inc., Taoyuan (TW)

(72) Inventors: Yun-Ting Ciou, Taoyuan (TW); Han-Chuan Tsai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 331 days.

(21) Appl. No.: 16/728,925

(22) Filed: Dec. 27, 2019

(65) Prior Publication Data
US 2021/0200650 A1    Jul. 1, 2021

(51) Int. Cl.
| | | |
|---|---|---|
| *G06F 11/32* | (2006.01) | |
| *G06F 11/22* | (2006.01) | |
| *G08B 5/36* | (2006.01) | |
| *G06F 9/4401* | (2018.01) | |

(52) U.S. Cl.
CPC ........ *G06F 11/2284* (2013.01); *G06F 9/4403* (2013.01); *G08B 5/36* (2013.01); *G06F 11/325* (2013.01)

(58) Field of Classification Search
CPC .. G06F 11/2284; G06F 11/325; G06F 11/327; G06F 11/324; G06F 11/32; G06F 11/321
See application file for complete search history.

(56) References Cited

U.S. PATENT DOCUMENTS

| | | | | |
|---|---|---|---|---|
| 5,543,727 A | * | 8/1996 | Bushard | G06F 11/24 714/E11.154 |
| 5,646,535 A | * | 7/1997 | Dornier | G06F 11/22 324/133 |
| 6,351,211 B1 | * | 2/2002 | Bussard | B60Q 1/44 340/472 |
| 7,065,682 B1 | * | 6/2006 | Cowan | G06F 11/3476 714/25 |

(Continued)

FOREIGN PATENT DOCUMENTS

| | | |
|---|---|---|
| CN | 104679626 A | 6/2015 |
| CN | 106649048 A | 5/2017 |

(Continued)

OTHER PUBLICATIONS

Wikipedia's Intelligent Platform Management Interface historical version published Dec. 23, 2019 https://en.wikipedia.org/w/index.php?title=Intelligent_Platform_Management_Interface&oldid=932157335 (Year: 2019).*

(Continued)

*Primary Examiner* — Joseph O Schell
(74) *Attorney, Agent, or Firm* — Nixon Peabody LLP

(57) ABSTRACT

A system and method for providing status information during a power-on self-test routine. The system includes a basic input output system operable to execute the power-on self-test routine and output the status of the power-on self-test routine. The system includes an externally visible indicator such as a server chassis identify LED. A controller is coupled to the basic input output system and the externally (Continued)

visible indicator. The controller is operable to receive the status from the basic input output system, and to control the externally visible indicator in response to the status received from the basic input output system.

20 Claims, 2 Drawing Sheets

(56) References Cited

U.S. PATENT DOCUMENTS

| | | | | |
|---|---|---|---|---|
| 2002/0113714 A1* | 8/2002 | Lopez | ................... | G06F 11/325 |
| | | | | 340/815.45 |
| 2009/0113194 A1* | 4/2009 | Orita | ................... | G06F 11/1417 |
| | | | | 713/1 |
| 2012/0137179 A1* | 5/2012 | Chin | ................... | G06F 11/2284 |
| | | | | 714/36 |
| 2019/0353392 A1* | 11/2019 | Atchison | ............... | G06F 3/0482 |

FOREIGN PATENT DOCUMENTS

| | | | |
|---|---|---|---|
| TW | 512275 | B | 12/2002 |
| TW | 200723107 | A | 6/2007 |
| TW | 200725262 | A | 7/2007 |
| TW | 201624294 | A * | 7/2016 |

OTHER PUBLICATIONS

TW Office Action for Application No. 109118886, dated Feb. 25, 2022, w/ First Office Action Summary.
TW Search Report for Application No. 109118886, dated Feb. 25, 2022, w/ First Office Action.
CN Office Action for Application No. 202010580143.X, dated Mar. 23, 2022, w/ First Office Action Summary.
CN Search Report for Application No. 202010580143.X, dated Mar. 23, 2022, w/ First Office Action.

* cited by examiner

METHOD AND SYSTEM FOR INDICATING BIOS POST STATUS FROM A CHASSIS IDENTIFYING LED

TECHNICAL FIELD

The present disclosure relates generally to status indicators for power-up routines for computing devices. More particularly, aspects of this disclosure relate using an external LED on a server chassis to indicate BIOS POST status.

BACKGROUND

Servers are employed in large numbers for high demand applications such as network based systems or data centers. The emergence of the cloud for computing applications has increased the demand for data centers. Data centers have numerous servers that store data and run applications accessed by remotely connected computer device users. A typical data center has physical chassis structures with attendant power and communication connections. Each rack may hold multiple computing servers and storage servers. Each individual server is typically powered-up with a power-on self-test (POST) routine to begin operation. During a POST routine for a computer system, such as a processor core on a server, the basic input output system (BIOS) may provide status codes to an external controller, such as a baseboard management controller (BMC).

A computing server is typically designed to compute and share the amount of data accessed over the internet or the local network. Unlike a desktop computer, servers do not generally have an attached display that may display status information during the power up routine. When the server is powering-up, the user can only identify whether the server is powered on or off from a power LED on the exterior of the chassis.

In modern computers, non-volatile dual in-line memory modules (DIMM) integrate non-volatile NAND flash memory with dynamic random access memory (DRAM) and provide the additional advantage of handling data protection. Such memory modules can trigger a backup and preserve data when the electrical power fails to a server. In order to support this secure data protection function, the boot-up speed in the improved DIMMs will be much slower than in traditional DIMMs since additional time is required to charge the battery.

In servers with improved DIMMs, the user may be confused as to whether the server is starting properly due to the longer time needed to power-up. The user thus does not know whether the server is loading properly or has frozen, if the operating system does not start-up in an expected period of time. In the light of this situation, it would be helpful for the user to identify the status of the startup routine of the server.

In the typical design of modern server, a user is unable to determine the current BIOS POST progress status. Although many circuit boards include a BIOS POST LED that lights up when the POST routine is in process, this LED is currently contained within the interior of the server chassis. Thus, a user cannot determine whether the server is booting-up successfully or freezing while booting.

A chassis identify LED is incorporated in the general design of many server systems. A blue colored LED is used for the chassis identify LED. This LED is visible from the exterior of the server. The system administrator can remotely light the chassis identify LED to aid in visually locating the chassis. When the chassis identify LED is lit or flashing, it indicates the location of the chassis, or it indicates that the chassis management module has detected a condition in the chassis that requires attention. However, the chassis identify LED and other exteriorly visible LEDs on current servers are not used to indicate the status of startup routines.

Thus, there is a need for a system that provides an externally visible LED on a server chassis to indicate the BIOS status. There is another need for a system that uses existing indicator hardware to indicate the status of the BIOS POST routine. There is also a need for an indicator to be controlled to indicate different stages of a BIOS POST routine.

SUMMARY

One disclosed example is a system for providing status information during a power-on self-test routine. The system includes a basic input output system operable to execute the power-on self-test routine and output the status of the power-on self-test routine. The system includes an externally visible indicator on a chassis. A controller is coupled to the basic input output system and the externally visible indicator. The controller is operable to receive the status from the basic input output system. The controller controls the externally visible indicator in response to the status received from the basic input output system.

In other implementations of the disclosed example, the controller is a baseboard management controller. In another implementation, the externally visible indicator is an LED. Alternatively, the LED is a chassis identify LED of a server chassis. In another implementation, the controller is operable to turn the visible indicator on and off at a first frequency for a first predetermined time, when the routine is at a first status. Alternatively, the controller is operable to turn the visible indicator on and off at a second frequency for a second predetermined time, after the first predetermined time, when the routine is at the first status. In an alternative implementation, the controller is operable to turn the visible indicator on and off at a third frequency, after the second predetermined time, when the routine is at the first status. In yet another implementation, the controller is operable to keep the visible indicator on when the routine reaches a second status. In yet another implementation, the second status is one of a group including activation of a splash screen, initialization of a CPU, or initialization of a memory.

Another disclosed example is a method for providing status information from a power-on self-test routine executed by a basic input output system on an externally visible indicator on a chassis. The power-on self-test routine is executed. A status based on the status of the execution of the power-on self-test routine is output. The externally visible indicator is controlled in response to the status received from the basic input output system.

In other implementations of the disclosed example method, the controller is a baseboard management controller. In another implementation, the externally visible indicator is an LED. Alternatively, the LED is a chassis identify LED of a server chassis. In another implementation, the controller is operable to turn the visible indicator on and off at a first frequency for a first predetermined time, when the routine is at a first status. Alternatively, the controller is operable to turn the visible indicator on and off at a second frequency for a second predetermined time, after the first predetermined time, when the routine is at the first status. In an alternative implementation, the controller is operable to turn the visible indicator on and off at a third frequency, after the second predetermined time, when the routine is at the first status. In yet another implementation, the controller is operable to keep the visible indicator on when the routine reaches a second status. In yet another implementation, the second status is one of a group including activation of a splash screen, initialization of a CPU, or initialization of a memory.

Another disclosed example is a server having a chassis with an external panel. The server has an externally visible LED on the external panel. A basic input output system executes the power-on self-test routine and outputs the status of the power-on self-test routine. A controller is coupled to the basic input output system and the externally visible LED. The controller receives the status from the basic input output system and controls the externally visible LED in response to the status received from the basic input output system. The externally visible LED can be a chassis identify LED. In other implementations of the disclosed example server, the externally visible LED is a chassis identify LED.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1A:
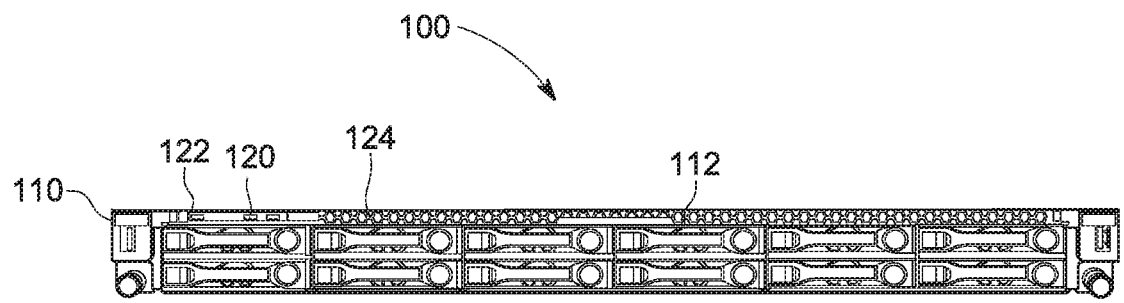
FIG. 1A is a view of a front panel of an example server showing a chassis identify LED that may be used to indicate BIOS POST status, according to certain aspects of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure uses an externally visible indicator of a server system, such as a light emitting diode (LED), such as a chassis identify LED, to indicate the startup routine of a basic input/output system (BIOS). The chassis identify LED may be flashed at different frequencies to reflect the time period that the routine has been running. The chassis identify LED may be held on, when the routine reaches a splash screen stage.

Figure 1B:
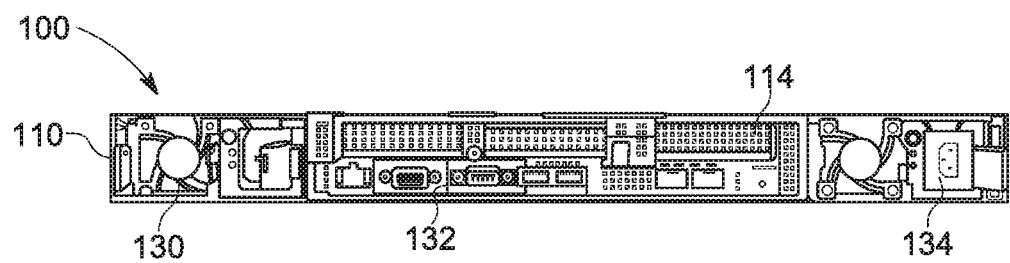
FIG. 1B is a view of a back panel of the example server in FIG. 1A.

FIG. 1A is a view of a front panel of an example server 100 showing a chassis identify LED that may be used to indicate BIOS POST status, according to certain aspects of the present disclosure. FIG. 1B is a view of a back panel of the example server 100 in FIG. 1A. The server 100 includes a chassis 110 with an externally visible front panel 112 and an opposite externally visible back panel 114. The chassis 110 includes visible indicators of different functions, such as a chassis identify LED 120 and a power LED 122 on the front panel 112. The front panel 112 includes slots that, in this example, hold hard disk drives or solid state drives 124. The back panel 114 includes fans 130, connectors 132, and a power supply unit 134.

In this example, the power LED 122 is turned on when power is provided to the server 100. The system administrator can remotely light the chassis identify LED 120 to aid in visually locating the chassis 110. When the chassis identify LED 120 is lit or flashing, it indicates the location of the chassis 110, or it indicates that an internal controller in the chassis 110 has detected a condition that requires attention. In this example, the chassis identify LED 120 is the color as the power LED 122. For example, the LEDs 122 and 124 may be green. In this example, the chassis identify LED 120 is also used to indicate the status of a startup routine of the server 100. In some cases, other LEDs on external panels of the chassis 110 can be used to display the progress status of the BIOS boot up process during the power up sequence of the server 100 in addition to or instead of the chassis identify LED 120. In some cases, when a server uses an indicator device other than an LED (e.g., incandescent lamps, electroluminescent panels, or other indicators) to present information about the server, such indicator devices can be can be used in place of an LED, as disclosed herein, to present information about the BIOS POST status.

Figure 2:
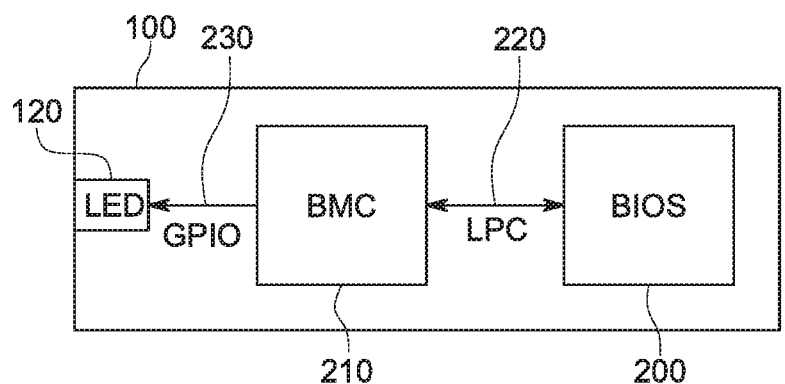
FIG. 2 is a block diagram of the components of the example server in FIG. 1.

FIG. 2 is a block diagram of the server 100 in FIG. 1. The server 100 includes a BIOS chip 200 and a baseboard memory controller (BMC) 210. The BMC 210 is coupled to the BIOS chip 200 via a low pin count (LPC) bus 220. A general purpose input/output (GPIO) pin 230 of the BMC 210 is coupled to the chassis identify LED 120. On power-up, the BIOS executes a POST routine. The BMC 210 receives the status of the POST routine from the BIOS chip 200 when the POST routine is executed. As described herein, the BMC 210 may operate the chassis identify LED 120 via the GPIO pin 230.

In this example, the chassis identify LED 120 is used to show the progress of the BIOS POST routine. Typically, different stages of the POST routine are executed in sequence. For example, a splash screen signal is output when the BIOS is in process of executing the POST routine. This signal may signify the initialization of the CPU or the initialization of the memory or a similar event that demonstrates the BIOS is running. The splash screen signal or a similar signal may be used to display a graphic on a connected display to indicate that the BIOS is running. In this example, a display is typically not connected to the server 100, but the splash screen signal, or a similar signal, indicates a specific point during the POST routine. Before the splash screen signal is activated by the POST routine, the chassis identify LED 120 is controlled by the BMC 210 to blink at different frequencies. In this example, a user can determine the wait time for the splash screen from the POST routine from the blinking frequency of the chassis identify LED 120. In this example, the chassis identify LED 120 initially blinks at 1 Hz for 3 minutes. After this period, the chassis identify LED 120 blinks at 2 Hz for 2 minutes. If the splash screen has not been enabled by the routine, the chassis identify LED 120 keeps blinking at 4 Hz. After the splash screen is enabled, the chassis identify LED 120 is kept on until the end of the BIOS POST routine. In this manner, a user may quickly determine how long the POST routine has been executing, and whether the splash screen activation has occurred.

Figure 3:
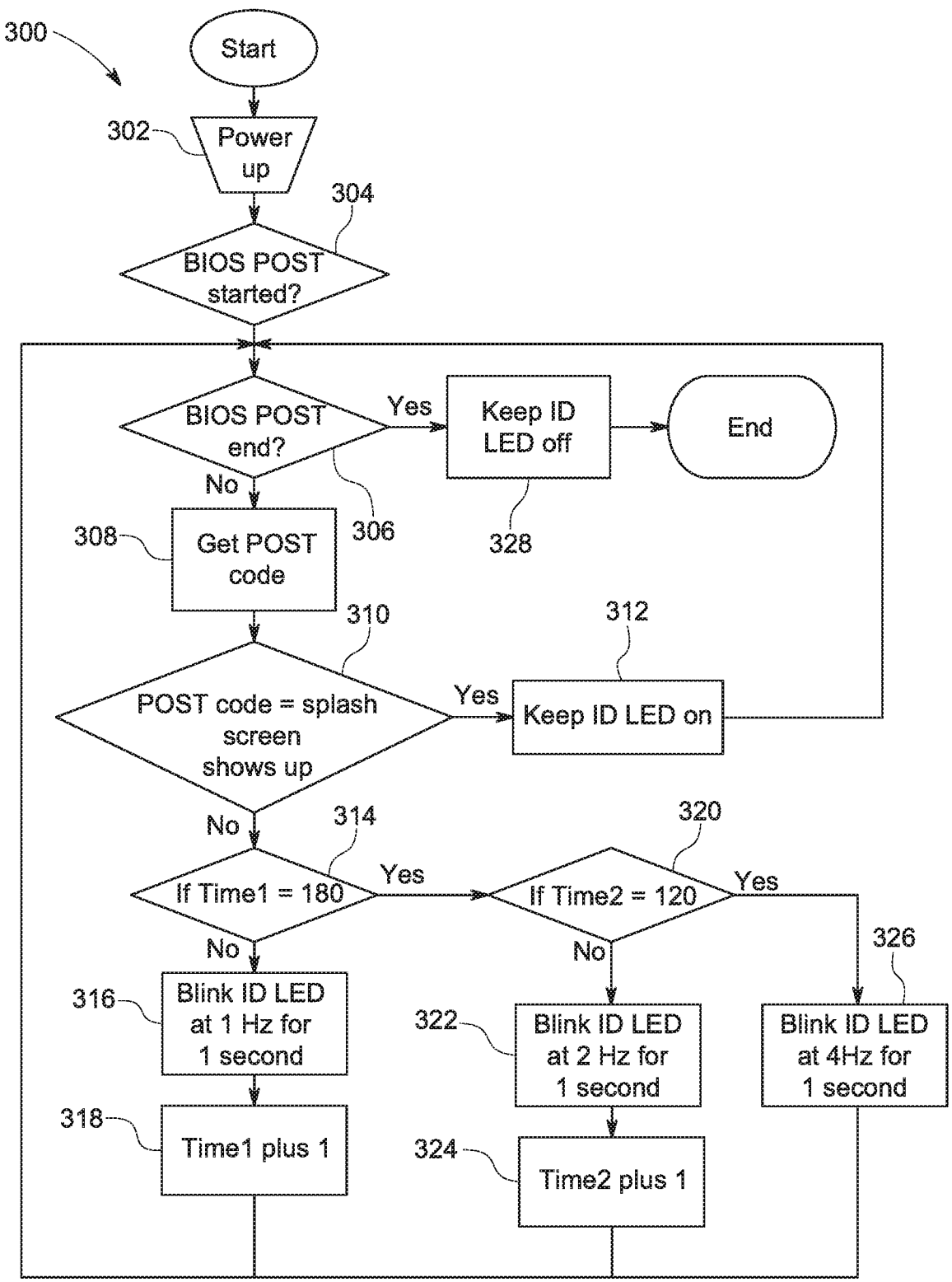
FIG. 3 is a flow diagram of the process of indicating BIOS POST status via the chassis identify LED, according to certain aspects of the present disclosure.

A flow diagram 300 in FIG. 3 is representative of example machine readable instructions for the process of controlling an external LED, such as the chassis identify LED 120 to indicate BIOS POST status. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

A server (e.g. server 100 in FIG. 1) is first powered up (302). On power-up, a BIOS on a BIOS chip such as the BIOS chip 200 in FIG. 2 executes the POST routine. The BIOS chip sends a POST status code to a BMC such as the BMC 210 in FIG. 2. The BMC determines whether the BIOS POST routine has started (304). The BMC then determines whether the BIOS POST routine has ended (306). If the POST routine has not ended in block 306, the BMC receives the BIOS POST status code from the BIOS chip (308). The BMC then determines whether the BIOS POST code indicates that a splash screen can be displayed by sending a splash screen signal (310). If the status code indicates the splash screen signal is active, the BMC lights a visual indicator such as the chassis identify LED 120 in FIG. 1 on the exterior of the server chassis (312). The BMC then returns to check whether the BIOS POST routine has ended (306).

If the POST status code indicates that the splash screen is not ready, the BMC determines whether an elapsed first time is at a first predetermined threshold time (314). In this example, the first predetermined threshold time is 180 seconds, but other times may be used. If the elapsed first time is not at the first threshold time, the BMC controls the LED to blink at 1 Hz for one second (316). The BMC then adds a second to the elapsed first time (318), and loops back to check whether the BIOS POST routine has ended (306). Thus, while the POST routine is running for three minutes, the chassis identify LED blinks at a frequency of 1 Hz If the BMC determines that the elapsed first time has reached the first predetermined threshold time (314), the BMC determines whether the elapsed second time has reached a second predetermined threshold time (320). In this example, the predetermined second threshold time is 120 seconds, but other times may be used. If the elapsed second time is not at the second threshold time, the BMC causes the LED to blink at 2 Hz for one second (322). The BMC then adds a second to the elapsed second time (324), and loops back to check whether the BIOS POST routine has ended (306). Thus, after the POST routine has run for three minutes, the chassis identify LED blinks at a frequency of 2 Hz for two additional minutes.

If the elapsed second time is at the second predetermined threshold of 120 seconds in block 320, the BMC controls the chassis identify LED to blink at 4 Hz for one second (326). The routine then loops back to check whether the BIOS POST routine has ended (306). Thus, after five minutes in this example, the chassis identify LED blinks faster until the splash screen activation occurs. If the POST routine has ended (306), the BMC keeps the ID LED off (328) and ends the routine. Thus, the chassis identify LED is kept on (312) from the time the splash screen is activated to the end of the POST routine.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system for providing status information during a power-on self-test routine, the system comprising:
   a basic input output system operable to execute the power-on self-test routine and output a status of the power-on self-test routine;
   an externally visible indicator on a chassis; and
   a controller coupled to the basic input output system and the externally visible indicator, the controller operable to:
   a) receive the status from the basic input output system and to control the externally visible indicator in response to the status received from the basic input output system during execution of the power-on self-test routine;
   b) after execution of the power-on self-test routine, receive a remote activation signal via a network and activate the externally visible indicator to indicate the location of the chassis; and
   c) after execution of the power-on self-test routine, detect a condition in the chassis requiring attention and activate the externally visible indicator in response to detecting the condition.

2. The system of claim 1, wherein the controller is a baseboard management controller.

3. The system of claim 1, wherein the externally visible indicator is a light emitting diode (LED).

4. The system of claim 3, wherein the light emitting diode (LED) is a chassis identify light emitting diode (LED) of a server chassis.

5. The system of claim 1, wherein the controller is operable to turn the visible indicator on and off at a first frequency for a first predetermined time, when the routine is at a first status.

6. The system of claim 5, wherein the controller is operable to turn the visible indicator on and off at a second frequency for a second predetermined time, after the first predetermined time, when the routine is at the first status.

7. The system of claim 6, wherein the controller is operable to turn the visible indicator on and off at a third frequency, after the second predetermined time, when the routine is at the first status.

8. The system of claim 5, wherein the controller is operable to keep the visible indicator on when the routine reaches a second status.

9. The system of claim 8, wherein the second status is one of a group including activation of a splash screen, initialization of a CPU, or initialization of a memory.

10. A method of providing status information from a power-on self-test routine executed by a basic input output system on an externally visible indicator on a chassis, the method comprising:
    executing the power-on self-test routine;
    outputting a status based on the status of the execution of the power-on self-test routine; and
    controlling the externally visible indicator in response to the status received from the basic input output system during execution of the power-on self-test routine;
    after execution of the power-on self-test routine, detecting a condition requiring attention and activating the externally visible indicator via a controller in response to detecting the condition requiring attention; and
    after execution of the power-on self-test routine, remotely activating the externally visible indicator through the controller via a network to indicate the location of the chassis.

11. The method of claim 10, wherein the controller is a baseboard management controller.

12. The method of claim 10, wherein the externally visible indicator is a light emitting diode (LED).

13. The method of claim 12, wherein the light emitting diode (LED) is a chassis identify light emitting diode (LED) of a server chassis.

14. The method of claim 10, wherein the visible indicator is turned on and off at a first frequency for a first predetermined time, when the routine is at a first status.

15. The method of claim 14, wherein the visible indicator is turned on and off at a second frequency for a second predetermined time, after the first predetermined time when the routine is at the first status.

16. The method of claim 15, wherein the visible indicator is turned on and off at a third frequency after the second predetermined time when the routine is at the first status.

17. The method of claim 14, wherein the visible indicator is turned on when the routine reaches a second status.

18. The method of claim 17, wherein the second status is one of a group including activation of a splash screen, initialization of a CPU, or initialization of a memory.

19. A server comprising:
    a chassis having an external panel;
    an externally visible light emitting diode (LED) on the external panel;
    a basic input output system operable to execute the power-on self-test routine and output the status of the power-on self-test routine; and
    a controller coupled to the basic input output system, a network, and the externally visible LED, the controller operable to;
    a) receive the status from the basic input output system and to control the externally visible LED in response to the status received from the basic input output system during execution of the power-on self-test routine;
    b) after the execution of the power-on self-test routine, activate the externally visible indicator in response to a remote activation command received via the network to indicate the location of the chassis; and c) after execution of the power-on self-test routine, detect a condition in the chassis requiring attention and activate the externally visible indicator in response to detecting the condition.

20. The server of claim 19, wherein the externally visible light emitting diode (LED) is a chassis identify LED.

* * * * *